United States Patent [19]

Ranner

[11] Patent Number: 4,739,849
[45] Date of Patent: Apr. 26, 1988

[54] TRACK-LAYING VEHICLE

[75] Inventor: Dietrich Ranner, Eugendorf, Austria

[73] Assignee: Bombardier-Rotax-Wien Produktions-und Vetriebsgesellschaft m.b.H., Vienna, Austria

[21] Appl. No.: 910,891

[22] Filed: Sep. 23, 1986

[30] Foreign Application Priority Data

Sep. 23, 1985 [AT] Austria .................................. 2774/85

[51] Int. Cl.$^4$ ............................................. B62D 55/00
[52] U.S. Cl. .................................................... 180/9.1
[58] Field of Search ...................... 180/9.1, 9.21, 9.26, 180/9.5, 9.52, 9.54, 9.56, 9.58, 9.6

[56] References Cited

U.S. PATENT DOCUMENTS

| 2,604,176 | 7/1952 | Lindemann | 180/9.54 |
| 4,226,293 | 10/1980 | Bieker | 180/9.5 |
| 4,324,304 | 4/1982 | Hashimoto | 180/9.52 |
| 4,445,582 | 5/1984 | Andersson | 180/9.5 |

FOREIGN PATENT DOCUMENTS

| 1169351 | 8/1958 | France | 180/9.1 |
| 35725 | 3/1954 | Poland | 180/9.1 |

Primary Examiner—John A. Pekar
Attorney, Agent, or Firm—Karl F. Ross; Herbert Dubno

[57] ABSTRACT

A track-laying vehicle of the type which has an engine, transmission, operators cabin, running wheels and tracks which extend around the running wheel, has a compound support structure consisting of a torsionally rigid, generally planar rectangular chassis frame which carries the enigne, the transmission and the operator's cabin. The running wheels and tracks, by contrast, are mounted upon a wheel-carrying frame and is substantially coextensive with an underside thereof. The wheel-carrying frame is torsionally compliant and is connected to the chassis frame by a plurality of elastic journals.

16 Claims, 3 Drawing Sheets

TRACK-LAYING VEHICLE

FIELD OF THE INVENTION

My present invention relates to a track-laying vehicle having a chassis frame and an undercarriage on which wheels or running rollers are mounted and which is suspended from the chassis frame, the chassis frame serving to carry the engine, transmission, operator or personnel or compartment and any load-carrying surfaces.

BACKGROUND OF THE INVENTION

Heavy duty track-laying vehicles generally comprise a twist-resistant or torsionally stiff or rigid chassis on which the running or guide rolls or wheels for the tracks are suspended usually with some type of torsion-bar suspension. Because of the considerable weight of such vehicles, it has been found to be advantageous, especially where continuous belt tracks are used, to replace the solid chassis construction by a chassis frame which, however, generally also is torsionally rigid and stiff. This construction has the drawback that forces transmitted during travel from the drive elements, i.e. the wheels or running rolls, to the chassis frame carry generally significant stresses which limit the operational life of the frame members, i.e. by causing premature metal and joint fatigue.

OBJECTS OF THE INVENTION

It is the principal object of my present invention to provide an improved track-laying-vehicle construction whereby these drawbacks are eliminated.

Another object is to provide an improved undercarriage construction for a track-laying vehicle, especially a track-laying vehicle utilizing a continuous or belt-type track, in which the stresses applied to the chassis frame can be reduced, the tendency toward fatigue therein limited and the useful life of the vehicle increased.

SUMMARY OF THE INVENTION

These objects and others which will become apparent, are attained in accordance with the invention by providing the suspended elements including the wheels, guide rolls or running rolls for the track of the undercarriage on a frame and which is referred to hereinafter as the wheel-carrying frame and which, advantageously, is torsionally or twist-compliant, the wheel-carrying frame being connected via a plurality, especially three, of elastic journals with the chassis frame, the latter being defined as the frame upon which the engine, transmission, operator cabin and, if desired, any load-carrying surface can be provided.

The objects of the invention are achieved, therefore, by separating the undercarriage elements from the chassis frame and providing them on a frame which is not torsionally rigid, but preferably is twist-compliant, but which is connected to the torsionally rigid chassis frame via respective elastomeric journals forming an elastomeric third connection.

When, therefore the wheel-carrying frame is completely twist-compliant so that it is not subjected to stress from the spring suspension of the wheels as the tracks pass over irregular terrain and substantial torsion forces are not applied to a rigid construction of the wheel-carrying frame, corresponding stresses are absorbed in the elastic connections between the wheel-carrying frame and the rigid frame construction of the chassis frame and substantial stresses capable of causing metal fatigue are then not applied to the latter.

The invention has the further advantage that with release of relatively few bolts the two frame members can be readily separated so that, for example, a winter undercarriage utilizing continuous tracks and pneumatic tire-guide wheels therefor can be substituted for a summer undercarriage utilizing a chain-type or linked track and respective running rolls or wheels, e.g. of steel, like those of military vehicles, such as tanks and armed personnel carriers.

The undercarriage of the invention is particularly applicable to such belt-type or continuous tracks which can be distinguished from tracks made-up of articulated links.

According to an important feature of the invention, the wheel-carrying frame is a ladder frame whose mutually parallel beams are coplanar and can be connected by cross-pieces which can include shafts which are rotatable or angularly displaceable in these beams.

Rockers or articulated arms carrying the wheels or track-engaging guide or running rolls can be swingably journaled on these shafts or can be connected to these shafts when the shafts are free to rotate. The torsion characteristics of the wheel-carrying frame are at an optimum in this construction.

To prevent relative shifting of the two beams of the wheel-carrying frame, the beams may be held spaced-apart by tubes which, in the regions between the beams, surround the respective shafts.

At one of these tubes the base of a triangular strut can be anchored while the apex of this strut, via an elastic and preferably elastomeric or rubber junction engages the other tube, most advantageously along the center line of the wheel-carrying frame between the two beams. Preferably the junction includes an articulation via a pintel or articulation pin. This configuration prevents edge pressures at the journals formed by the shafts in the respective beams.

To connect the wheel-carrying frame top the chassis frame, the wheel-carrying frame is provided in a plane perpendicular to the plane of the beams with spaced apart elastomeric bushings, preferably having metal sleeves embedded in rubber bodies, and which can be received between the eyes of two such pairs of eyes fixed rigidly on the chassis frame, the eyes of each pair and the respective bushing being traversed by a respective pair extend generally parallel to the longitudinal axis of the vehicle.

The third elastic connection between the wheel-carrying frame and the chassis frame preferably lies along this axis and in the longitudinal median plane of the vehicle, is at the apex of the aforementioned strut and can include a bracket which receives the other of the above-mentioned tubes via an elastomeric sleeve.

The bushings and the third elastomeric sleeve of the third elastic connection preferably are disposed symmetrically to the longitudinal median plane of the vehicle.

The bracket according to the invention thus forms a rotatably elastic junction with the cross-piece of the latter frame and can have a substantially horizontal surface which is bolted or otherwise connected to a flange likewise extending generally horizontally on the chassis frame. The bolts can pass through the bracket surface and the flange.

Advantageously, the bracket can have a bearing eye in which an elastic member such as a rubber sleeve is received and which is connected to the apex of the triangular strut. The elastic connection of the strut of the cross-piece of the wheel-carrying frame serves also, therefore, as the elastic junction between the wheel-carrying frame and the chassis frame.

BRIEF DESCRIPTION OF THE DRAWINGS

The above and other objects, features and advantages of the present invention will become more readily apparent hereinafter, reference being made to the accompanying highly diagrammatic drawing, in which.

SPECIFIC DESCRIPTION

Figure 1:
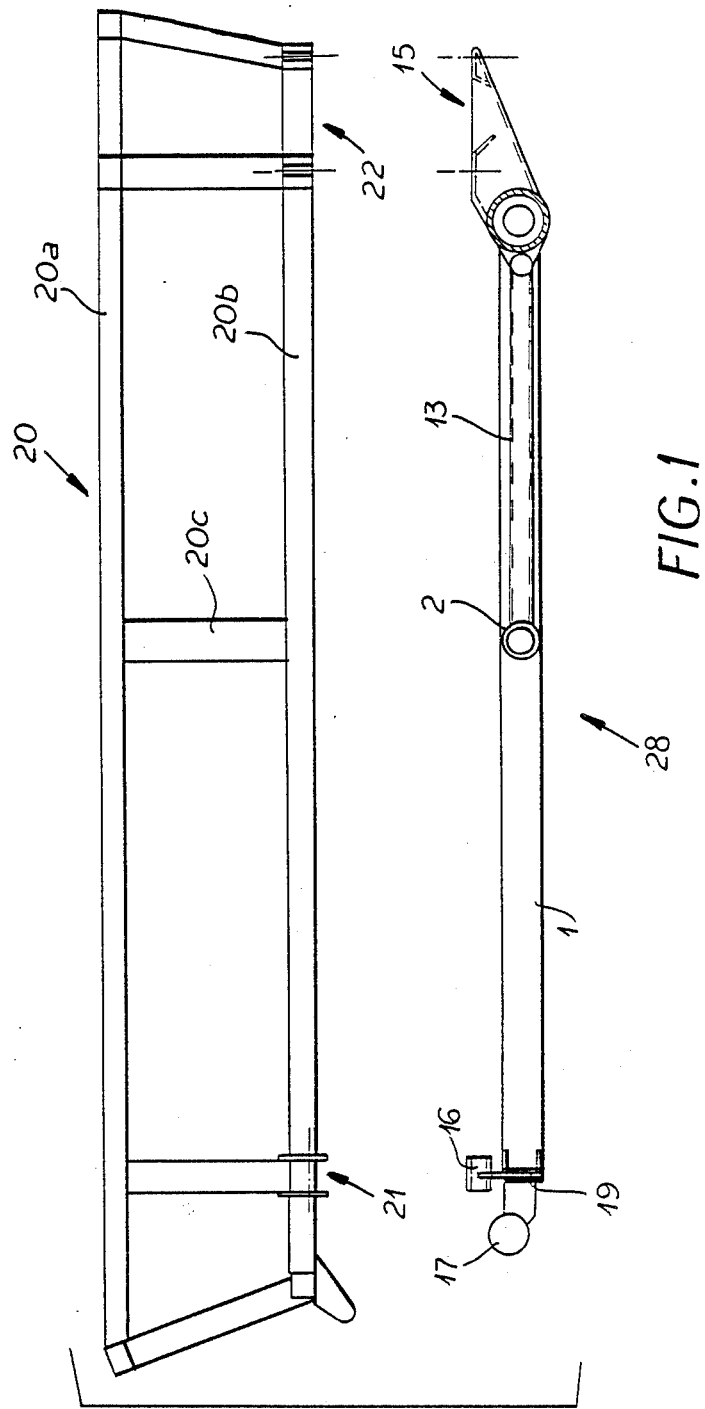
FIG. 1 is a diagrammatic exploded view of the frame parts of a track-laying vehicle embodying the invention.

The chassis frame 20 shown in FIG. 1 only in highly diagrammatic form, is torsionally stiff and comprises upper and lower members 20a and 20b, interconnected by cross-members perpendicular to the plane of the paper in FIG. 1 and not otherwise visible, as well as upright members 20c extending vertically between the upper and lower members.

The chassis frame 20 is constructed to receive the engine, transmission, operator cabin, and any load-carrying surface of the vehicle as is conventional with the chassis of track-laying vehicles.

The undercarriage comprises a wheel-carrying frame which has been generally represented at 28 and has been shown in detail in FIG. 2, in which a portion of a belt-type track T is shown below the wheels W and which may be pneumatic tire wheels and a drive wheel D which may be formed with teeth cooperating with teeth on the inner surface of the belt T forming the track.

Figure 2:
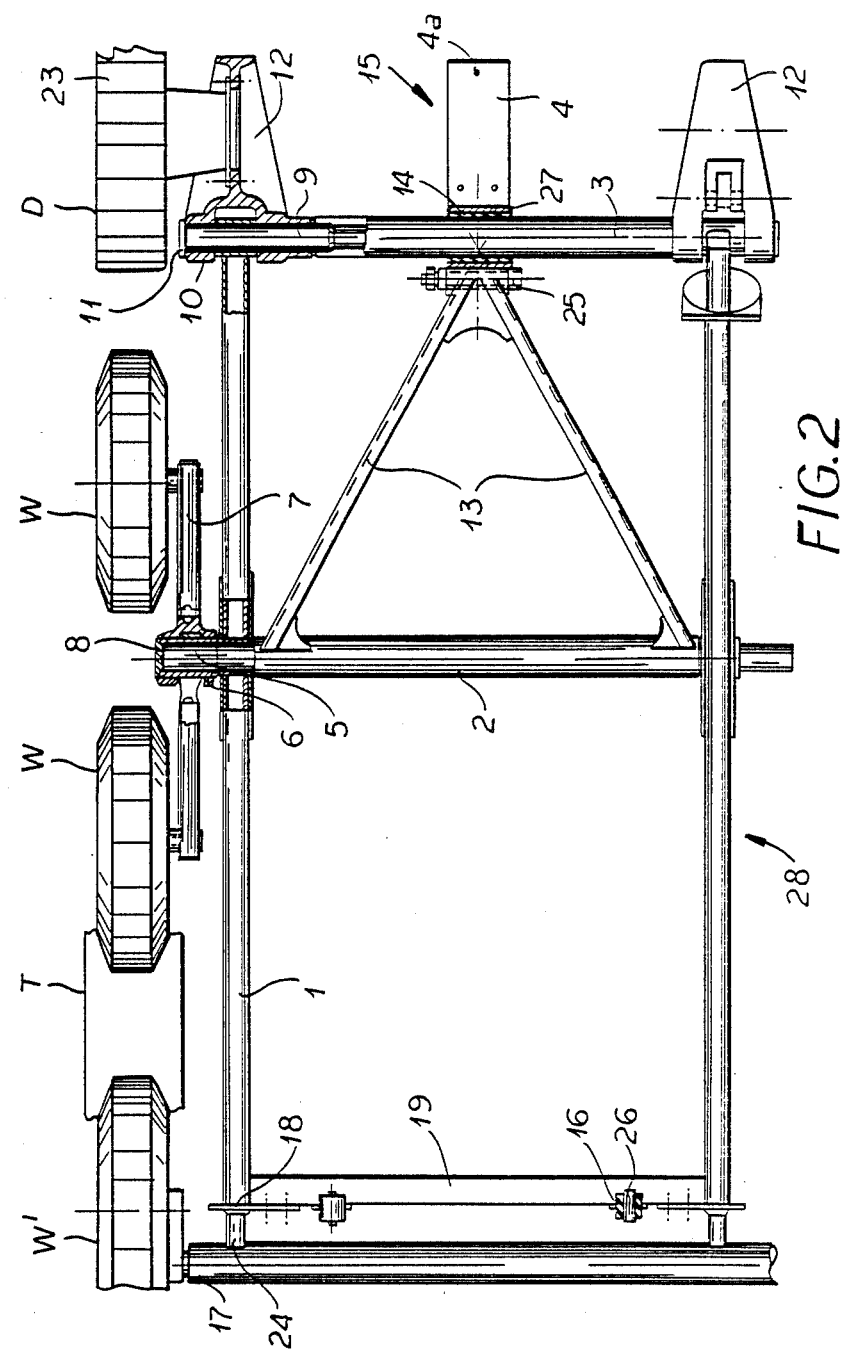
FIG. 2 is a plan view, partly broken away, of the wheel-carrying frame.

As can be seen from FIG. 2, moreover, the wheel-carrying frame 28 is of ladder construction and comprises two mutually parallel beams 1 interconnected by cross-pieces or 'rungs' of the ladder.

These cross-pieces can be formed in part by two shafts 5 and 9 which are journaled in the beams 1 at bearings 6 and 10 and which are surrounded in the region between the beams 1 by tubes 2 and 3 which brace the beams 1 apart. The shaft 9 carries the swingable arms 12, each of which is provided with a sprocket wheel 23 and which can be provided with any conventional spring suspension, e.g. a torsion-bar suspension formed by the shaft 9.

This suspension resiliently supports the wheels 23, of which only one has been shown relative to the frame 28.

The ends of the shaft 5, which can also function as a torsion bar, can be keys to rockers 7 (only one is shown) at the end of which wheels W are journaled.

The third cross-piece or rung 19 is a torsionally compliant U-cross-section member or channel, attached at plates 18 to the beams 1.

The beams 1 can be polygonal cross-section tubes so formed that plug-like formations 24 can be inserted therein to carry a tension axle 17 mounting a tension upon the tracks T which can pass about the wheels W' carried by the shafts of this axle.

To prevent the beams 1 from shifting relative to one another and thus allowing the edge pressures to develop in the bearings 6 and 10, the tube 2 forms an anchor for the base of a triangular strut 13 which is articulated by a pin 25 in the region of its apex in an elastic mounting, preferably a rubber mounting including the elastomeric bushing 14 and a sleeve or eye in the bracket 15 in which this bushing is mounted.

The bushing 14 can surround the tube 3.

The legs of the structure 13 are also advantageously formed from twist-compliant channels or members of a U-section.

Torsional stresses about the longitudinal axes of the wheel-carrying frame 28 give rise to angular displacements in the elastic bearings of the cross-pieces without applying significant stresses to the rigid elements of the chassis frame.

The assembly of the frame 28 is effected so that the beams 1 are mounted on the cross pieces, namely, on the shafts 5 and 9 provided with the tubes 2 and 3 whereupon, the ends of the shaft 9 are fitted through the beams 1 and the arms 12, and the rockers 7 are applied to the ends of the shaft 5. These members are then held in place by the attachment of cover disks 8 and 11 preventing the wheel suspensions 7 and 12 from coming off of the respective shafts. The last assembly step is the attachment of the girder 19 with the plates 18.

The wheel-carrying frame 28 comprises, symmetrically to its longitudinal median plane which is perpendicular to the plane of the drawing in FIG. 2 elastomeric bushings 16 which can be of the type in which metal sleeves are embedded in the rubber bodies. Each of these bushings is received between the eyes 21 of two pairs of such eyes formed rigidly on the chassis frame 20.

Along the longitudinal median plane, a third elastic journal is formed for the chassis frame via the aforementioned bracket 15.

The bracket 15 is provided with a horizontally oriented seat or surface 4 engagable with a flange 22 of the chassis frame 20.

Figure 3:
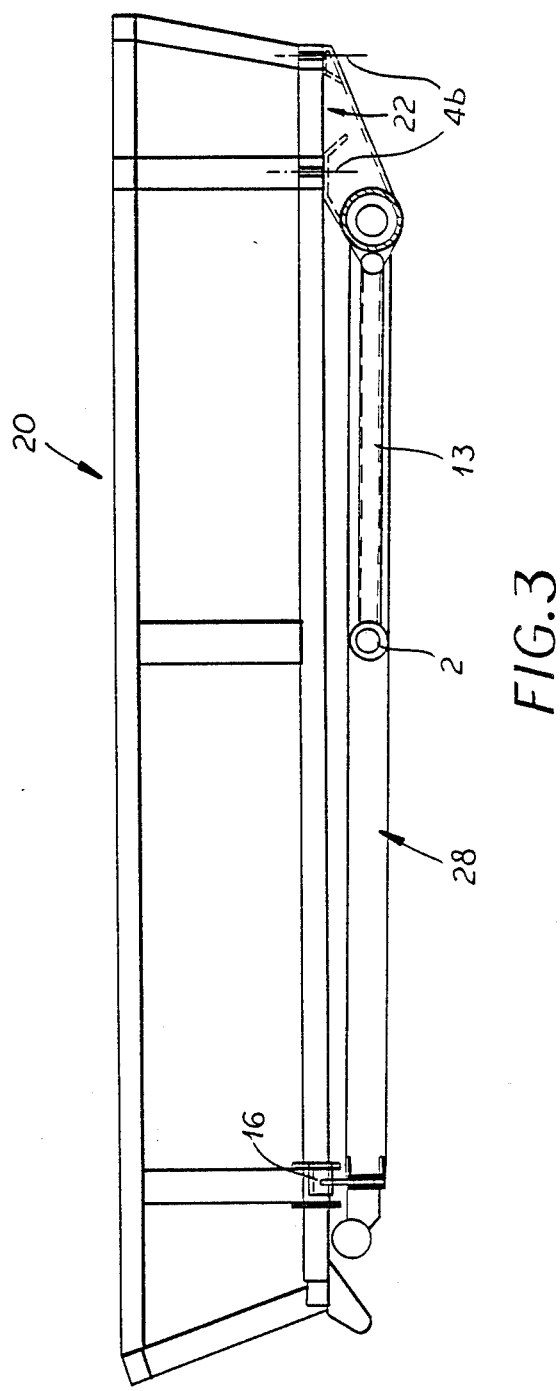
FIG. 3 is a side-elevational view showing the two frame parts attached together.

The seat 4 and the flange 22 are connected by screws which traverse registering holes represented by crosses at 4a in FIG. 2 the bolts being represented by their axes 4b in FIG. 3.

The bracket 15 has a sleeve or eye 27 which receives the rubber bushing 14 to which the apex of the strut is connected by the pin 25, as previously noted. The eye or sleeve 27 can be slid over the bushing 14.

For connection of the chassis frame 20 with the wheel-carrying frame 28, the eyes 21 are first fastened to the elastomer bushings 16 which are fixed on the cross-piece 19 via pins 26. The flange 22 is then bolted to the bracket 15. The elements 14 and 16 thus form an elastic 3-point connection which mounts the undercarriage on the rung or chassis frame.

I claim:

1. In a track-laying vehicle having a chassis frame on which an engine, transmission and operator's cabin can be carried, and undercarriage provided with chassis-suspended elements including running wheels around which respective tracks of the vehicle can pass, the improvement wherein:

said undercarriage includes a torsionally compliant wheel-carrying frame forming a unit with said elements; and three elastic journals connects said wheel-carrying frame with said chassis frame to mount said unit on said chassis frame, said wheel carrying frame being formed as a ladder frame having a pair of coplanar mutually parallel beams interconnected by shafts extending transversely of the beams and rotatable therein, said elements being mounted on said shafts.

2. The improvement defined in claim 1 wherein said elements include rockers fulcrummed on one of said shafts and carrying wheels at opposite ends of each rocker.

3. The improvement defined in claim 1 wherein said elements include supports articulated to said wheel-carrying frame at one of said shafts, and respective wheels mounted on said supports.

4. The improvement defined in claim 1 wherein each of said shafts is surrounded, in regions between said beams, by a respective tube, a base of a triangular strut being anchored to one of said tubes, an apex of said triangular strut being connected at an elastic junction with the other of said tubes.

5. The improvement defined in claim 4 wherein said junction is located substantially along a longitudinal centerline of said wheel-carrying frame between said beams.

6. The improvement defined in claim 5 wherein said junction includes an articulation between said apex and said other tube, said articulation including a pin parallel to said other tube.

7. The improvement defined in claim 6 wherein said junction is formed with a rubber sleeve connecting said articulation to said other tube.

8. The improvement defined in claim 6 wherein said strut is formed from torsionally compliant U-section members.

9. The improvement defined in claim 1 wherein said wheel-carrying frame is provided with a pair of elastomeric bushings in a plane perpendicular to the plane of said beams and defining two of said elastic journals, said chassis frame having corresponding pairs of eyes receiving said bushings between the eyes of the respective pairs, pins traversing the eyes of each pair and the said bushing received between them.

10. The improvement defined in claim 9 wherein the third of said elastic journals is located in a longitudinal median plane of the vehicle between said beams, perpendicular to the plane of said beams and to the plane of said bushings.

11. The improvement defined in claim 9 wherein said bushings comprise metal sleeves embedded in rubber bodies.

12. The improvement defined in claim 10 wherein said third elastic journal includes a bracket connected with rotational elasticity to a crosspiece of said wheel-carrying frame and secured to said chassis frame.

13. The improvement defined in claim 12 wherein said bracket has a substantially horizontal surface bolted to a substantially horizontal flange of said chassis frame.

14. The improvement defined in claim 12 wherein said bracket has a bearing eye receiving a rubber bushing traversed by said crosspiece.

15. The improvement defined in claim 14 wherein each of said shafts is surrounded, in regions between said beams, by a respective tube, a base of a triangular strut being anchored to one of said tubes, an apex of said triangular strut being connected to said bracket at said bearing eye, said crosspiece being another of said tubes.

16. In a track-laying vehicle having an engine, transmission, operator's cabin, running wheels and tracks extending around said running wheels, the improvement which comprises, in combination:

a torsionally rigid generally planar rectangular chassis frame carrying said engine, said transmission and said operator's cabin;

a torsionally compliant generally planar rectangular wheel-carrying frame disposed below said chassis frame and substantially coextensive with an underside thereof, said wheel-carrying frame forming an undercarriage unit with said running wheels and track; and a plurality of elastic journals connecting said wheel-carrying frame to said chassis frame to mount said unit on said chassis frame.

* * * * *